United States Patent
Nalbant (10) Patent No.: US 10,608,471 B2
(45) Date of Patent: Mar. 31, 2020

(54) MULTIMODE WIRELESS POWER RECEIVER CIRCUIT

(71) Applicant: Integrated Deivce Technology, Inc., San Jose, CA (US)

(72) Inventor: Mehmet Nalbant, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 276 days.

(21) Appl. No.: 15/268,328

(22) Filed: Sep. 16, 2016

(65) Prior Publication Data

US 2018/0083487 A1   Mar. 22, 2018

(51) Int. Cl.
| H01F 27/42 | (2006.01) |
| H01F 37/00 | (2006.01) |
| H01F 38/00 | (2006.01) |
| H02J 50/12 | (2016.01) |
| H02J 7/02  | (2016.01) |
| H02J 7/00  | (2006.01) |

(52) U.S. Cl.
CPC ........... H02J 50/12 (2016.02); H02J 7/0029 (2013.01); H02J 7/025 (2013.01)

(58) Field of Classification Search
CPC . H02J 5/005; H02J 7/025; H02J 17/00; H01F 38/14; B60L 11/182
USPC ........................................................ 307/104
See application file for complete search history.

(56) References Cited

U.S. PATENT DOCUMENTS

| 6,356,198 B1* | 3/2002 | Wuidart | G06K 19/0723 235/384 |
| 2011/0101790 A1* | 5/2011 | Budgett | H02J 50/12 307/104 |
| 2012/0139358 A1* | 6/2012 | Teggatz | H01F 38/14 307/104 |
| 2013/0147279 A1* | 6/2013 | Muratov | H02J 5/005 307/104 |
| 2014/0035383 A1* | 2/2014 | Riehl | H01F 38/14 307/104 |
| 2015/0137611 A1* | 5/2015 | Huang | H02J 5/005 307/104 |
| 2015/0357827 A1* | 12/2015 | Muratov | H02J 50/10 307/104 |
| 2016/0079764 A1* | 3/2016 | Cho | H02J 50/80 307/104 |
| 2017/0018937 A1* | 1/2017 | Muratov | H02J 50/12 |
| 2018/0048185 A1* | 2/2018 | Hwang | H02J 50/12 |

* cited by examiner

Primary Examiner — Anh Q Tra
(74) Attorney, Agent, or Firm — Haynes and Boone, LLP (57) ABSTRACT

A multimode receiver can include on or more of an overvoltage protection circuit or a high frequency mode switch. As such, some embodiments of a multi-mode receiver includes a rectifier; a high frequency circuit coupled to the rectifier; a low frequency circuit coupled to the rectifier; and a switching circuit coupled to disable at least a portion of the low frequency circuit while the multi-mode receiver operates in high frequency mode. In some embodiments, the multimode receiver further includes a high-voltage protection circuit coupled to the high frequency circuit that detunes the high frequency circuit when a high-voltage condition is detected.

9 Claims, 7 Drawing Sheets

MULTIMODE WIRELESS POWER RECEIVER CIRCUIT

TECHNICAL FIELD

Embodiments of the present invention are related to wireless power receivers and, specifically, to multimode wireless power receivers.

DISCUSSION OF RELATED ART

Mobile devices, for example smart phones and tablets, are increasingly using wireless power charging systems. However, there are multiple different standards for wireless transfer of power, which utilize a variety of different transmission frequencies. Frequencies used can vary widely, for example from less than 200 KHz to over 6.78 MHz.

The more common standards for wireless transmission of power include the Alliance for Wireless Power (A4WP) standard and the Wireless Power Consortium standard, the Qi Standard. Under the A4WP standard, for example, up to 50 watts of power can be inductively transmitted to multiple charging devices in the vicinity of a coil at a power transmission frequency of around 6.78 MHz. Under the Wireless Power Consortium, the Qi specification, a resonant inductive coupling system is utilized to charge a single device at the resonance frequency of the device. In the Qi standard, the receiving device coil is placed in close proximity with the transmission coil while in the A4WP standard, the receiving device coil is placed near the transmitting coil, potentially along with other receiving coils that belong to other charging devices.

Devices that can utilize multiple wireless power transmission standards often require the implementation of wholly separate power receiving circuitry for each standard and range of frequencies utilized. Given the cost and the space requirements, especially in a mobile device, providing a device that can use multiple methods of wireless power transmissions is prohibitive.

Therefore, there is a need to develop better wireless charging technologies.

SUMMARY

In accordance with aspects of the presents a multimode receiver. The multimode receiver can include on or more of an over-voltage protection circuit or a high frequency mode switch. As such, some embodiments of a multi-mode receiver includes a rectifier; a high frequency circuit coupled to the rectifier; a low frequency circuit coupled to the rectifier; and a switching circuit coupled to disable at least a portion of the low frequency circuit while the multi-mode receiver operates in high frequency mode. In some embodiments, the multimode receiver further includes a high-voltage protection circuit coupled to the high frequency circuit that detunes the high frequency circuit when a high-voltage condition is detected.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
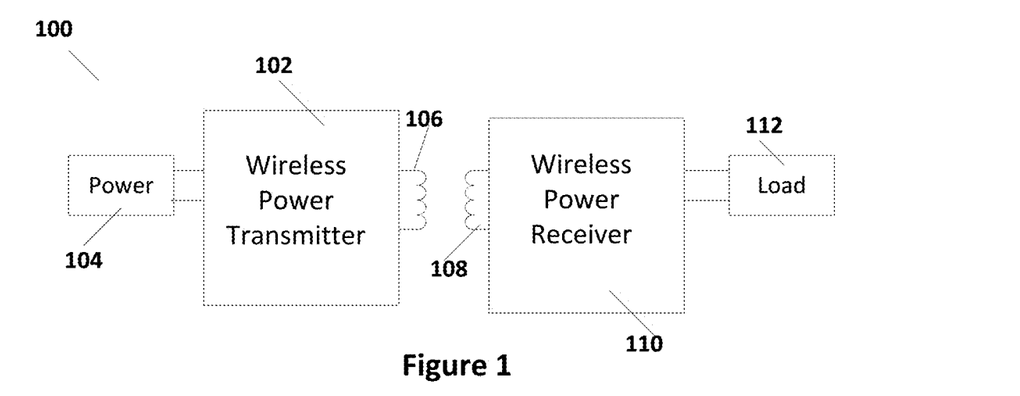
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current for example 120V at 60 Hz. Wireless power transmitter 102 drives coil 106 at, typically, a range of frequencies, typically according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, which may be a battery charger and/or other components of a mobile device. Receiver 110 typically includes rectification to convert the received AC power to DC power for load 112.

Figure 2:
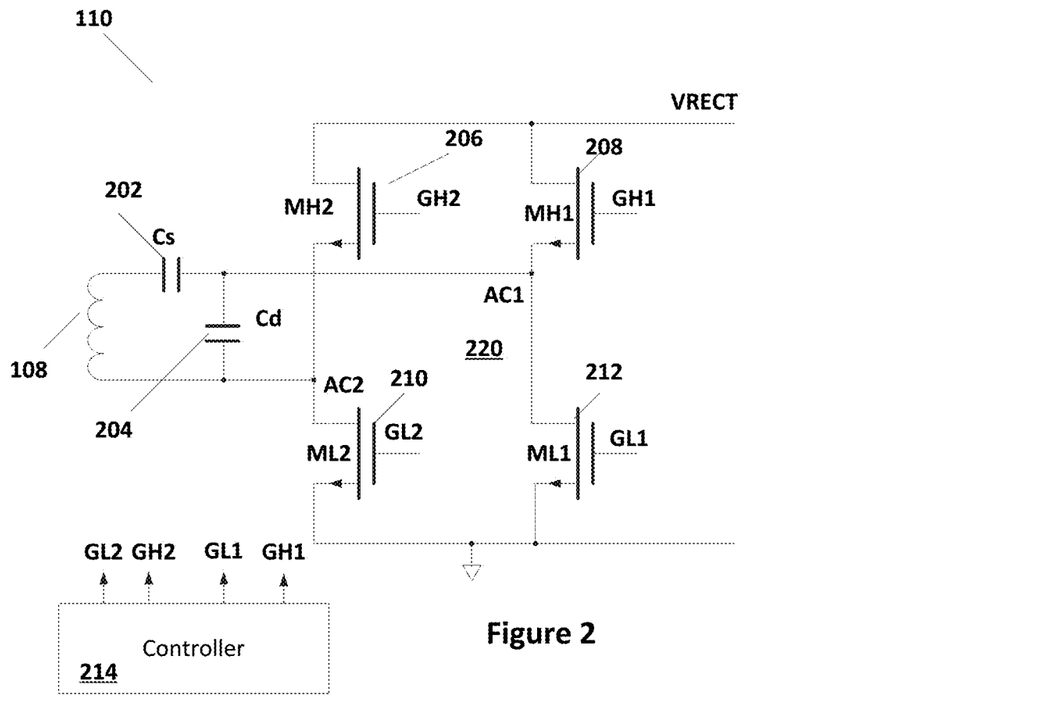
FIG. 2 illustrates a receiver of a wireless power transmission system that can be used in the transmission system illustrated in FIG. 1.

FIG. 2 illustrates an example of receiver 110 illustrated in FIG. 1. As shown in FIG. 2, coil 108 is coupled through capacitor 202 and capacitor 204 to a full-bridge rectifier circuit 220 formed by metal oxide semiconductor field effect transistors (MOSFETs) 206, 208, 210, and 212. AC power, illustrated as AC1 and AC2, received by coil 108 is rectified in rectifier 220 to generate rectified voltage VRECT. The gates of transistors 206, 208, 210 and 212, labeled GH2, GH1, GL2, and GL1, respectively, are driven by a controller 214. Controller 214 can drive the gates of transistors 206, 208, 210, and 212 to optimize the receipt of power at coil 108 and the delivery of rectified power to load 112. In some embodiments, the output from rectifier 220, the voltage labeled VRECT in FIG. 2, may be further filtered and processed prior to assertion across load 112. VRECT can be placed on a power line while transistors 210 and 212 are coupled to a ground line. One skilled in the art will recognize that, although a full-bridge rectifier 220 is illustrated in FIG. 2, other embodiments may include a half-bridge rectifier. Further, rectifier 220 may be formed completely or partially of diodes instead of controlled transistors such as transistors 206, 208, 210, and 212. Further, various filtering and buck or boost circuits may also be used in providing DC voltage VRECT to a load 112.

Some embodiments of the present invention are illustrated using the components of receiver 110. One skilled in the art will recognize how other receivers can be modified to provide further embodiments of the invention. For example, receiver 110 may further include a DC-DC voltage regulator receiving voltage Vrect from the rectifier and providing power to load 112.

The example of receiver 110 illustrated in FIG. 2 is appropriate for a single standard of wireless power transmission. In general, each standard requires that coil 108 meet specifications specific to that standard. Embodiments of the present invention allow for operation with different standards, referred to as multi-mode operation, using a single rectifier circuit. In multimode operation multiple coils share the same physical space. However, the energy transmission frequencies used in different modes of operation can be very different, for example a first mode may operate at 6.78 MHz and a second mode may operate at less than 200 KHz.

The 6.78 MHz and the 200 KHz transmission standards require components that make sharing a single rectifying bridge difficult, if not impractical. For example, the low frequency standard requires a rather large shunt capacitance just before the rectifier bridge, which detrimentally affects operation in a mode operating at higher frequencies such as 6.78 MHz.

Previously, two rectifier bridges have been used so that there were separate circuits for low frequency operation and high frequency operation. This approach avoids problems associated with circuits operating with the low frequency mode interfering with circuits operating with the high frequency mode. The disadvantage of this approach, however, is the space occupied by two separated circuits can be large, negatively impacting the size and layout of the device in which the charger is provided.

Another approach involves connecting multiple coils together in series. However, the disadvantage of the series connection is the non-symmetry of the resulting circuit, which may potentially result in electromagnetic interference (EMI) issues and may further result in low efficiencies of power reception due to circulating currents being present in each of the coils.

Two issues present themselves in a receiver that includes multi-mode operation: Overvoltage requirements and cross-coupling of the high-frequency and low frequency operation. Some embodiments of the present invention address one or both of these issues.

Accordingly, embodiments of the present invention include multiple coils for multi-mode operation where the multiple coils use a single rectifier circuit. A switching circuitry that disconnects the shunt capacitance used for low frequency operation when high frequency operation is sensed is included in the receiver. Additionally, an overvoltage circuit may be included to protect the high frequency circuit during operation of the low frequency circuit. Further, the multiple coil phases can be connected in a way that is more advantageous to an efficient wireless power transfer.

Figure 3:
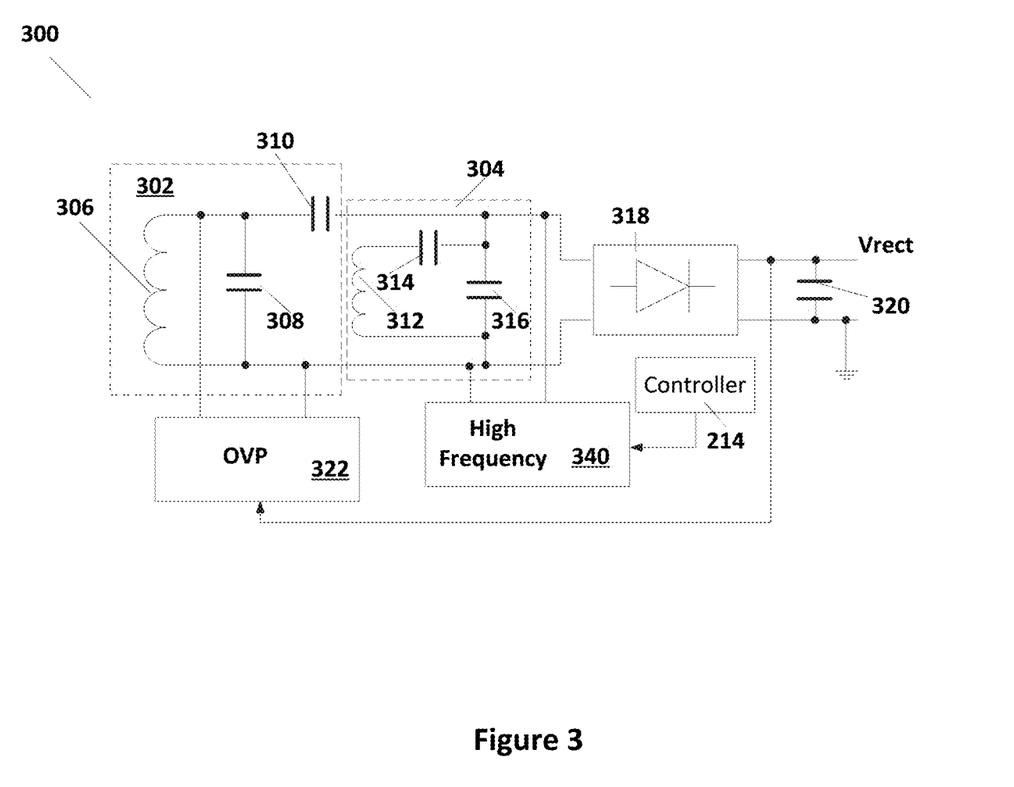
FIG. 3 illustrates a receiver according to some embodiments that includes multiple coils for receiving wireless power.

FIG. 3 illustrates an example embodiment that operates in a multi-mode fashion while using a single rectifier circuit. As shown in FIG. 3, a high frequency circuit 302 includes a coil 306 and a shunt capacitor 308 coupled across coil 306. A coupling capacitor 310 couples the high frequency circuit 302 to a rectifier 318.

As is further illustrated in FIG. 3, a low frequency circuit 304 includes a coil 312. Coil 312 is coupled in series with a coupling capacitor 314, which couples coil 312 to rectifier 318. A shunt capacitor 316 is coupled across the series combination of coil 312 and coupling capacitor 314.

As such, rectifier 318 receives power from both low frequency circuit 304 and high frequency circuit 302 and outputs rectified voltage Vrect. A capacitor 320 can be coupled between Vrect and ground. Rectifier 318 can be any rectifier, such as the full-wave rectifier illustrated in FIG. 2, for example. Rectifier 318 can be a full-wave rectifier, half-wave rectifier, and may be formed with diodes, transistors, or a combination of diodes and transistors. Further, rectifier 318 may include filtering and DC-DC conversion circuits in order to produce the output voltage Vrect.

As discussed above, shunt capacitor 316 of low frequency circuit 304 can be larger than shunt capacitor 308 and may be large enough to detrimentally interfere with receipt of power in high frequency circuit 302 while operating at high frequency. Such interference may result in substantial loss of efficiency while operating in high frequency mode. Consequently, as illustrated in FIG. 3, a switching circuit 340 can be coupled across shunt capacitor 316. Switching circuit 340, on detection of high frequency operation, effectively removes shunt capacitor 316, and coil 312, from the circuit so that high frequency circuit 302 can operate without interference from the circuit elements in low frequency circuit 304. As is illustrated in FIG. 3, switching circuit 340 can receive a signal from controller 214. The signal from controller 214 indicates whether receiver 300 is operating in a high frequency mode or a low frequency mode. Further, over voltage protection (OVP) circuit 322 may be coupled across high-frequency circuit 302.

Figure 4:
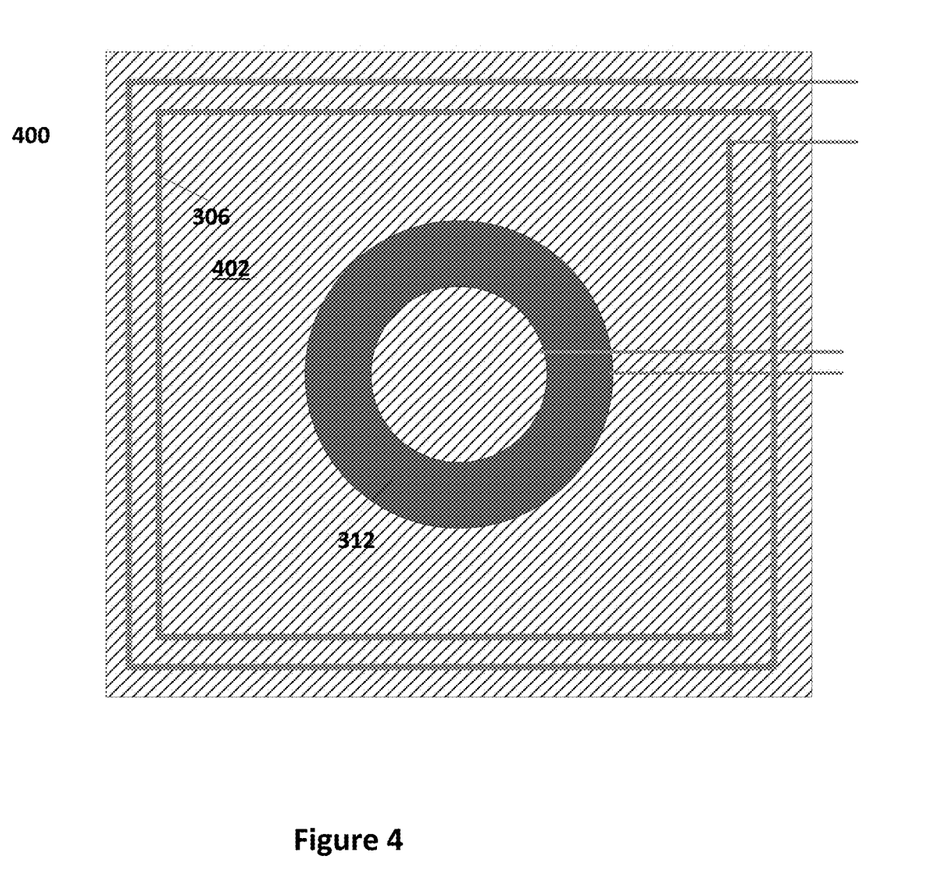
FIG. 4 illustrates a receiver coil configuration that can be used with the receiver illustrated in FIG. 3.

FIG. 4 illustrates an antenna array 400 that can be used in receiver 300 as illustrated in FIG. 3. As illustrated in FIG. 4, a low frequency coil 312 and a high frequency coil 306 are mounted on a substrate 402. Substrate 402 may, for example, be formed with a magnetic material mounted on a hard surface. Such an arrangement of dual coils allows for receiver 300 to operate in a dual-mode fashion.

Returning to FIG. 3, OVP circuit 322 is coupled across high-frequency circuit 302 in order to prevent damage to high frequency circuit 302 due to an over voltage situation.

Over voltage protection in loosely coupled magnetic resonance systems presents certain challenges. Existing proposals range from clamping Zener diodes, or similar devices, to disconnect devices or to provide FET devices. However, Zener diodes have the potential of dissipating high amounts of power causing burn-ups and self-destruction, therefore providing no subsequent protection. Consequently Zeners are brute force protection methods of uncertain effectiveness. FET disconnect devices have to be high voltage, are difficult to integrate, and are difficult to drive. They are also in the direct path of the current. Typically, back-to-back FETs are used. However, depending on their placement in the circuit, FETs may result in destruction of resonant capacitors, thereby damaging the receiver.

Consequently, OVP circuit 322 according to certain embodiments operates by detuning the resonance of the circuit receiver circuit formed by coil 306 and capacitor 308. In some embodiments, OVP circuit 322 detunes high-frequency circuit 302 by providing additional capacitance to shunt capacitor 308, causing circuit 302 to become less efficient at receiving wireless power at the operating frequency. Although some power may be dissipated in OVP circuit 322 itself, an effective method of limiting voltage in high-frequency circuit 302 may result.

Figure 5A:
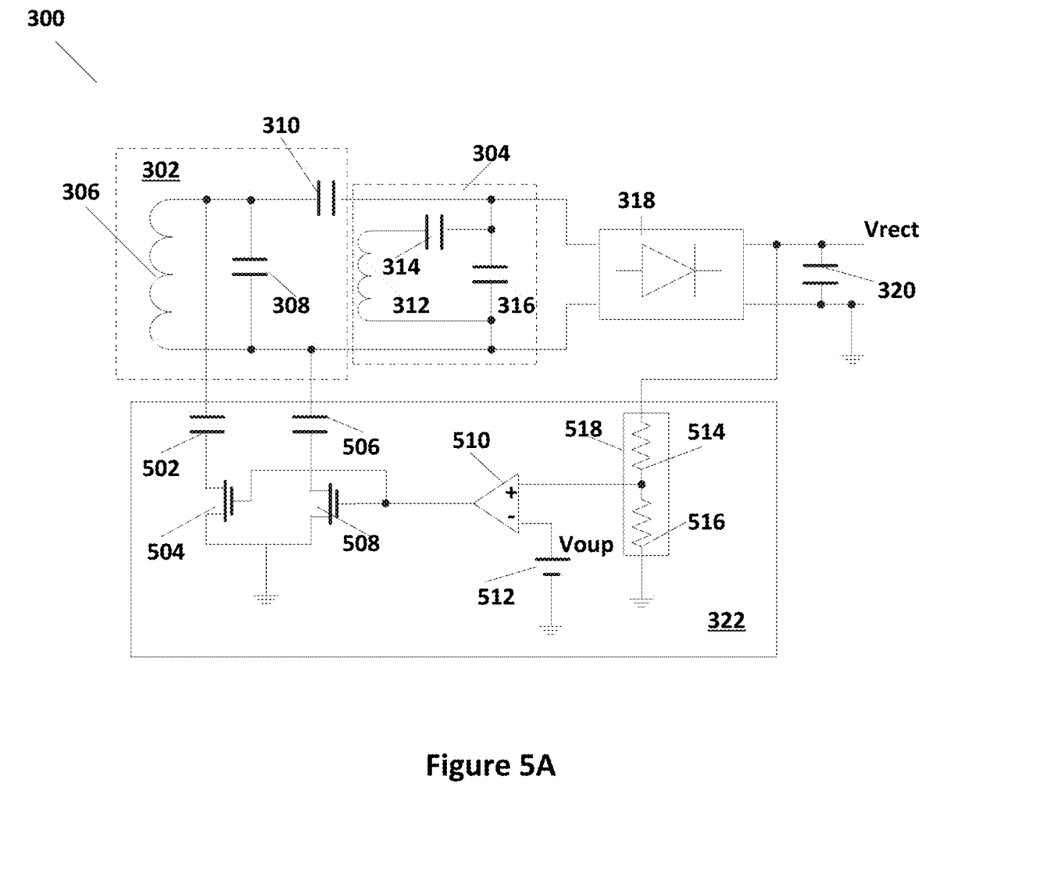
FIGS. 5A and 5B illustrate an example of an over-voltage protection circuit as illustrated in FIG. 3.

FIG. 5A illustrates an example of over-voltage protection (OVP) circuit 322 according to some embodiments. As shown in FIG. 5A, the rectified voltage Vrect is input to OVP 322. The value of Vrect is used to identify whether an over-voltage condition exists. In the example illustrated in FIG. 5A, Vrect is input to block 518, which provides a voltage level to comparator 510. Block 518 may provide the voltage Vrect directly to comparator 510. However, as is illustrated in FIG. 5A, Vrect may be input to a voltage divider or other voltage shifter formed by series coupled resistors 514 and 516. The output signal from block 518 is input to comparator driver 510. Driver 510 outputs a high value when the output signal from block 518 is over a voltage Voup formed by source 512 and outputs a low value when the output signal from block 518 is under the voltage Voup formed by source 512. In some embodiments, driver 510 may include hysteresis to avoid oscillation between high value output and low value output if the output signal from block 518 is near Vout. The output signal from driver 510 is input to the gates of transistors 504 and 508. When driver 510 outputs a high value, turning transistors 504 and 508 on, a first side of shunt capacitor 308 is coupled to ground through capacitor 502 and a second side of shunt capacitor 308 is coupled to ground through capacitor 504, effectively shifting the capacitance of shunt capacitor 308 in the resonant circuit, and consequently detuning the resonant circuit formed by coil 306 and capacitor 308. When driver 510 outputs a low value, transistors 502 and 506 are both off and power can be received from coil 306 across shunt capacitor 308 at the resonant circuit.

Figure 5B:
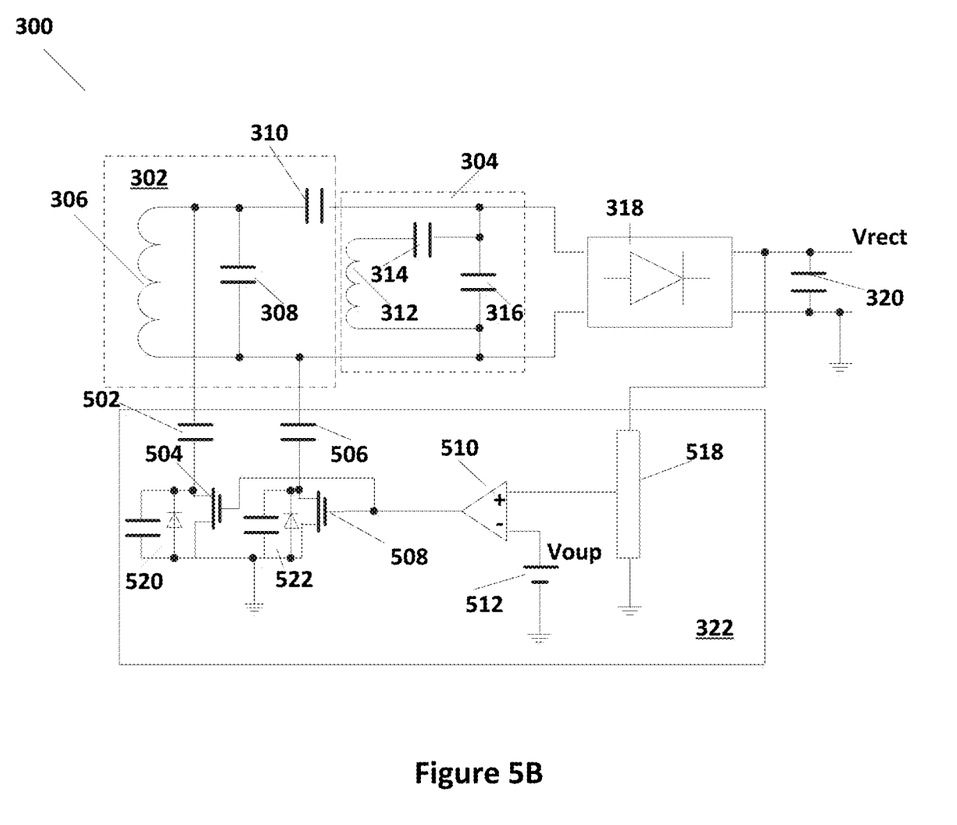

In some embodiments, as shown in FIG. 5B, a capacitor-diode pairs 520 and 522 can be provided across transistors 504 and 508, respectively. Consequently, capacitors 502 and 506 along with the capacitors in capacitor-diode circuits 520 and 522 are involved in the resonance of high frequency circuit 302 during normal operation. Engaging transistors 504 and 508 then detunes the resonant circuit by bypassing the capacitors in capacitor-diode circuits 520 and 522.

In the embodiments shown in FIGS. 5A and 5B, upon detection of an overvoltage condition, capacitance is added are removed from the receiver resonant circuit in order to de-tune the resonant circuit from its operational frequency. As the resonant circuit is de-tuned, it receives the incoming wireless power less efficiently, and therefore the voltage generated drops to more acceptable level.

Figure 6A:
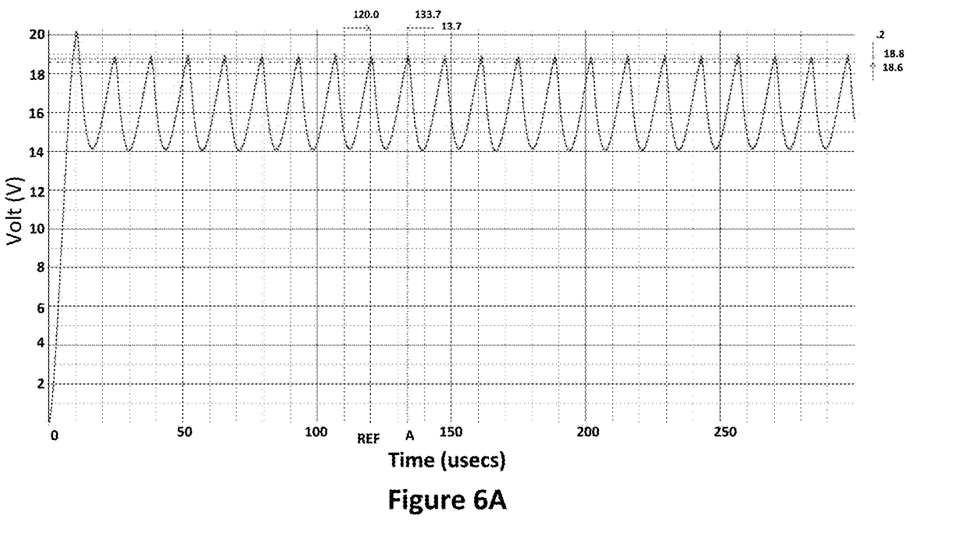
FIGS. 6A and 6B illustrate simulations during operation of the over voltage protection circuit illustrated in FIG. 5.
Figure 6B:
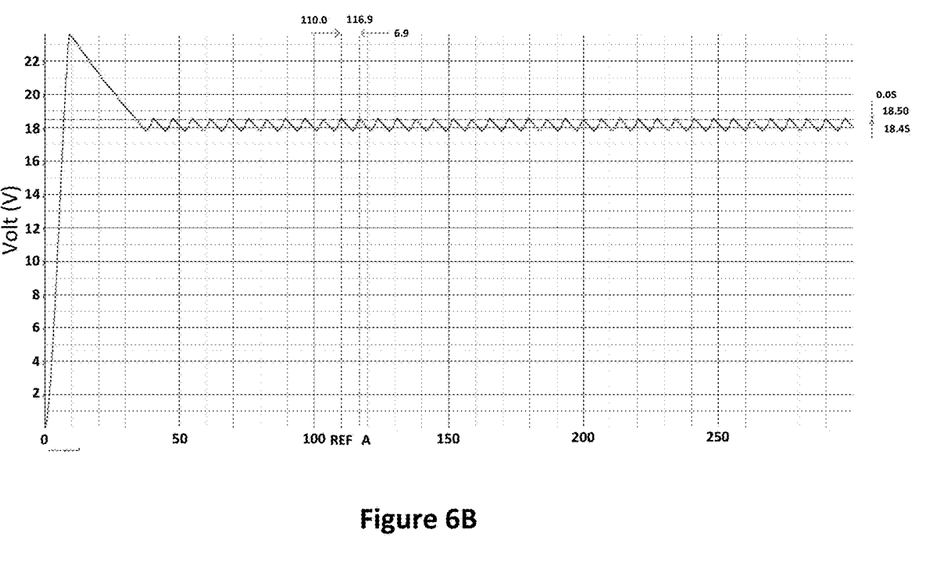

FIGS. 6A and 6B illustrate simulations of OVP circuit 322 as illustrated in FIGS. 5A and 5B. FIG. 6A illustrates an example operation of the example illustrated in FIG. 5A while FIG. 6B illustrates an example operation of the example illustrated in FIG. 5B. As shown in FIG. 6A, as the voltage input to block 518 increases about threshold voltage, transistors 504 and 508 turn on, thereby detuning the resonant circuit. Consequently, the voltage drops until it is below a point where transistors 504 and 508 are turned off. FIG. 6B illustrates the effects of providing capacitors 520 and 522. As illustrated, the voltage will have a periodic characteristic driven by the voltage reaching an overvoltage condition and correcting.

As discussed above, dual mode operation is possible with a single bridge as illustrated in FIG. 3. As shown in FIG. 3, bridge 318 receives power from both high frequency circuit 302 and low frequency circuit 304. As was discussed above, during high frequency operation of high frequency circuit 302 may see interference from capacitor 316 of low frequency circuit 304. Further, some efficiency may be lost in high frequency operation due to circulating current in coil 312. There may be further losses due to the effect of low frequency coil 312 sharing the "magnetic space" and in many cases the same magnetic shield as the high frequency coil 306, as is illustrated in FIG. 4.

Figure 7:
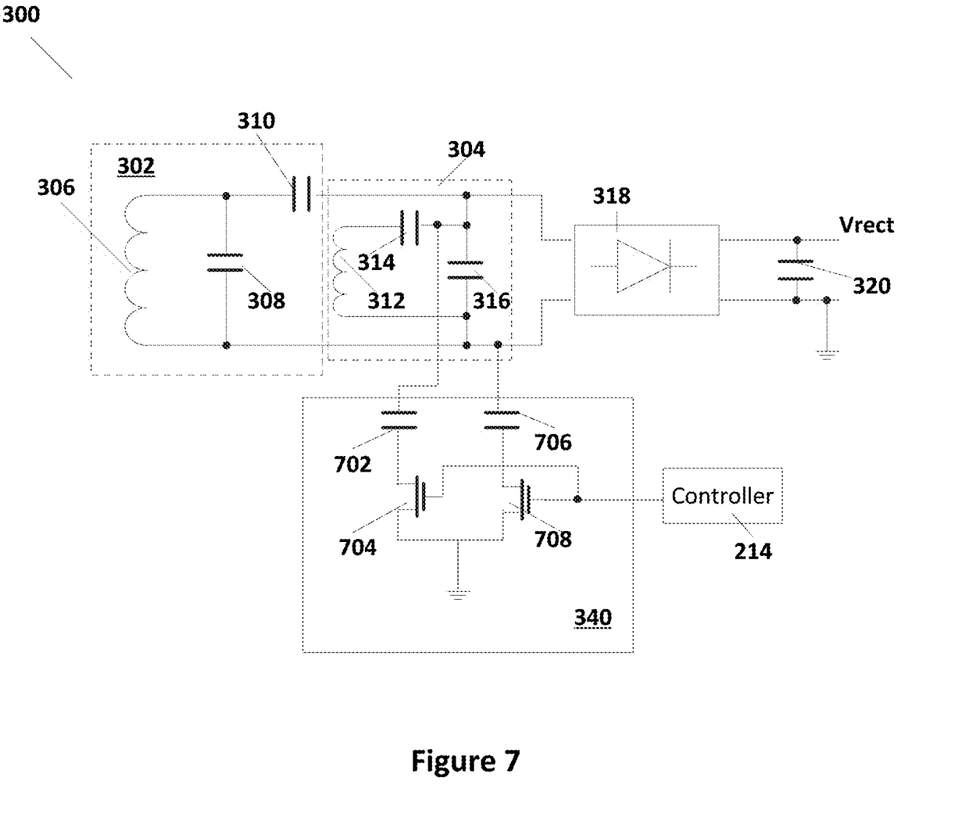
FIG. 7 illustrates an example of a high frequency operation circuit as illustrated in FIG. 3.

FIG. 7 illustrates an example of switching circuit 340. Switching circuit 340 effectively reduces the effects of high frequency coil 312 by adding capacitance 702 to ground and capacitance 706 to ground across shunt capacitor 316 so that, during high frequency operation, the influence of low frequency circuit 304 on the operation of high frequency circuit 302 is reduced. As shown in FIG. 7, controller 214 provides a signal that indicates whether receiver 300 is operating in a high frequency mode or a low frequency mode. If a high frequency mode is indicated, transistors 704 and 708 are turned on, coupling capacitor 702 between a first side of capacitor 316 and ground and coupling capacitor 706 between a second side of capacitor 316 and ground. Switching circuit 340 effectively removes capacitor 316 from receiver 300.

The above detailed description is provided to illustrate specific embodiments of the present invention and is not intended to be limiting. Numerous variations and modifications within the scope of the present invention are possible. The present invention is set forth in the following claims.

What is claimed is:

1. A multi-mode receiver, comprising:
   a rectifier;
   a high frequency circuit with a high frequency coil, coupled to the rectifier;
   a low frequency circuit with a low frequency coil, coupled to the rectifier, wherein the low frequency coil is separate from the high frequency coil; and
   a switching circuit coupled to provide additional capacitance to the low frequency circuit, at least partially disabling the low frequency circuit, while the multi-mode receiver operates in high frequency mode.

2. The receiver of claim 1, wherein the low frequency circuit includes:
   a shunt capacitor coupled in parallel with the low frequency coil,
   wherein the switching circuit is configured to couple both sides of the shunt capacitor to a ground through capacitors in high frequency mode.

3. The receiver of claim 2, wherein the switching circuit comprises:
 a first transistor configured to couple a first side of the shunt capacitor to the ground through a first capacitor; and
 a second transistor configured to couple a second side of the shunt capacitor to the ground through a second capacitor,
 wherein a controller provides a signal to gates of the first transistor and the second transistor, the signal depending on high frequency operation.

4. The receiver of claim 1, further including an over voltage protection circuit coupled to the high frequency circuit.

5. The receiver of claim 4, wherein the over voltage protection circuit de-tunes the high frequency circuit when an over voltage condition is detected.

6. The receiver of claim 5, wherein the over-voltage protection circuit includes
 an overvoltage protection circuit configured to provide an overvoltage signal when the overvoltage condition is detected; and
 transistors driven by the overvoltage signal of the over-voltage protection circuit to change a resonant frequency of the high frequency circuit.

7. A method of receiving power wirelessly, comprising:
 detecting a low frequency mode or a high frequency mode of power receipt;
 receiving power in a low frequency circuit with a low frequency coil if the low frequency mode is detected;
 at least partially disabling the low frequency circuit with the low frequency coil by applying additional capacitance across the low frequency coil and receiving power in a high frequency circuit if the high frequency mode is detected, wherein the low frequency coil is separate from the high frequency coil; and
 rectifying power from the low frequency circuit and the high frequency circuit with a single rectifier.

8. The method of claim 7, wherein disabling the low frequency circuit comprises:
 coupling both sides of a shunt capacitor in the low frequency circuit to a ground through a capacitance when a high frequency mode is detected.

9. A receiver, comprising:
 a high frequency receiver including a first inductor coupled in parallel with a first capacitor;
 a low frequency receiver including a second inductor coupled in parallel with a second capacitor;
 a rectifier coupled across the high frequency receiver;
 a switching circuit coupled to disable a part of the low frequency receiver by applying additional capacitance during operation of the high frequency receiver; and
 an over-voltage protection circuit coupled across the high frequency receiver, the over-voltage protection circuit de-tuning the high frequency receiver when an over-voltage condition is detected.

* * * * *